United States Patent [19]
Keller

[11] Patent Number: 6,100,361
[45] Date of Patent: Aug. 8, 2000

[54] GOLF BALL TOP COATING CONTAINING AN AROMATIC/ALIPHATIC POLYISOCYANATE COPOLYMER

[75] Inventor: Viktor Keller, Enfield, Conn.

[73] Assignee: Spalding Sports Worldwide, Inc., Chicopee, Mass.

[21] Appl. No.: 09/302,891

[22] Filed: Apr. 30, 1999

[51] Int. Cl.[7] .................................................. C08G 18/70
[52] U.S. Cl. ................................ 528/67; 528/44; 528/59; 528/60; 528/65; 528/66
[58] Field of Search ................................. 528/44, 59, 60, 528/65, 66, 67

[56] References Cited

U.S. PATENT DOCUMENTS

| | | | |
|---|---|---|---|
| 4,359,550 | 11/1982 | Narayan et al. | 524/871 |
| 4,518,761 | 5/1985 | Richter et al. | 528/67 |
| 5,344,851 | 9/1994 | Hovestadt et al. | 521/49 |
| 5,409,233 | 4/1995 | Kennedy | 273/235 A |
| 5,459,220 | 10/1995 | Kennedy | 528/44 |
| 5,494,291 | 2/1996 | Kennedy | 273/235 |
| 5,563,207 | 10/1996 | Brahm et al. | 524/391 |
| 5,587,448 | 12/1996 | Engen | 528/55 |
| 5,645,931 | 7/1997 | Fan et al. | 428/334 |

FOREIGN PATENT DOCUMENTS 1234972  6/1971  United Kingdom .

OTHER PUBLICATIONS

Product Information, Coatings, Miles, Industrial Chemicals Division, 1 page (date unknown).

*Primary Examiner*—Ana Woodward

[57] ABSTRACT

A urethane top coat prepared by combining a polyol and a blend of an aliphatic diisocyanate and an aliphatic/aromatic polyisocyanate copolymer is provided, along with a method for its use as the top coating for a golf ball. The inventive top coating demonstrates an increased rate of curing compared to other top coatings having similar abrasion resistance and color retention qualities.

9 Claims, No Drawings

GOLF BALL TOP COATING CONTAINING AN AROMATIC/ALIPHATIC POLYISOCYANATE COPOLYMER

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

The present invention relates to golf balls having a clear finish or top coating and, in particular, to an improved polyurethane top coating composition for golf balls.

For decades, golf balls were finished by applying an opaque coating to the outer surface to the golf ball cover. To achieve a desirable white appearance, a multicoat paint system typically comprising a primer coat followed by one or more opaque coatings was applied to the golf ball. Such golf balls are typically referred to as "painted balls".

In the 1980's, a pigment was incorporated into the cover material prior to molding the cover of the golf ball, thereby eliminating the step of painting the golf ball. Such golf balls are typically referred to as "pigmented balls".

Whether the golf balls are painted or pigmented, identifying indicia such as the manufacturer's trademark or logo, or a model or identification number are stamped on the ball. In order to prevent the stamped indicia from being rubbed off, and also to impart a desirable glossiness to the ball, one or two clear finishes or top coatings are applied to the ball. Typically, such clear coatings consist of a clear epoxy primer, followed by a clear urethane top coat. The urethane top coat is usually a two part polyurethane, including a polyol part and a diisocyanate part. The two parts are mixed together and reacted to form the urethane coating.

While early urethane top coatings imparted a desirable glossiness to the ball, they suffered from certain disadvantages. For example, the urethane coatings made from aromatic diisocyanates tended to yellow very quickly upon exposure to ultraviolet light, thus detracting from the appearance of the painted or pigmented ball. Also, the early urethane coatings typically suffered from adhesion and abrasion resistance problems. Good adhesion is required to protect the indicia stamped on the ball, while good abrasion resistance is needed to maintain the glossiness of the ball.

To avoid the problems associated with the early urethane top coatings, urethane top coatings have been prepared using biurets and isocyanurate trimers of hexamethylene diisocyanate as crosslinking agents. Coatings made with such crosslinking agents exhibit superior adhesion and abrasion resistance, and superior color retention upon exposure to ultraviolet radiation. Top coatings using these crosslinking agents are disclosed in U.S. Pat. No. 5,459,220, which is incorporated herein by reference in its entirety.

Although the top coatings disclosed in U.S. Pat. No. 5,459,220 are qualitatively superior to earlier top coatings, application of these and other similar coatings to golf balls requires a drying or curing period. To describe the typical application process in more detail, the polyol and diisocyanate parts of the top coat are premixed in a pressure pot. Dry air is used to push the coating to an air atomizing spray gun where it is forced out of a small diameter fluid nozzle onto the surface of the golf balls. The sprayed golf balls are then placed into an oven for a predetermined length of time, and at a predetermined temperature, such that the solvent evaporates and the polyol and the diisocyanate polymerize to form the desired top coat. The oven times necessary to cure existing top coats can range anywhere from five minutes to six hours or more, while oven temperatures typically range from 140° F. to 200° F.

Regardless of whether the manufacturer uses a fast cure top coat (with cure times measured in minutes) or a slow cure top coat (with cure times measured in hours), the balls must spend some time in an oven to effect the cure. As the time necessary to cure a particular top coat increases, the golf balls must either spend more time in the ovens or be subjected to higher oven temperatures. Either way, greater amounts of energy must be applied to the golf balls to complete the manufacturing process, thus increasing the cost of manufacture. In addition, as a golf ball is exposed to greater amounts of heat, the possibility of damage to the surface of the ball itself is increased. For example, the surface of a modern golf ball is covered with spaced "dimples" to improve the aerodynamics of the ball when it travels through the air. Excessive heat exposure may cause the dimples to deform. Even a slight aberration in the shape of the dimples can adversely affect the ball's aerodynamic properties.

BRIEF SUMMARY OF THE INVENTION

Accordingly, it is an object of the present invention to provide a urethane top coating that demonstrates an increased rate of curing compared to at least some other top coatings.

Another object of the present invention is to provide a urethane top coating that can be applied to a golf ball with less risk of damaging the surface of the golf ball.

An additional object of the present invention is to provide a urethane top coating that demonstrates superior adhesion and abrasion resistance and yet still demonstrates an increased rate of curing compared to at least some other top coatings.

Still another object of the present invention is to provide a urethane top coating that demonstrates good color retention (non-yellowing) properties and yet still demonstrates an increased rate of curing compared to at least some other top coatings.

Other objects of the invention will become apparent to one skilled in the art who has the benefit of the specification and the prior art.

One aspect of the invention which satisfies one or more of the foregoing objects, in whole or in part, is a urethane top coat made from the reaction of a polyol portion with an isocyanate blend comprised of an aliphatic diisocyanate and an aliphatic/aromatic polyisocyanate copolymer, where the aliphatic/aromatic copolymer is in the blend at up to 50 parts by weight per 50 parts by weight of the purely aliphatic diisocyanate.

Another aspect of the invention is a urethane top coat as previously defined, where the aliphatic diisocyanate is a biuret of hexamethylene diisocyanate, an isocyanurate trimer of hexamethylene diisocyanate, or a mixture of the two.

Still another aspect of the invention is a urethane top coat as previously defined, where the aliphatic/aromatic polyisocyanate copolymer includes toluene diisocyanate and hexamethylene diisocyanate.

Yet another aspect of the invention is a urethane top coat as previously defined, where the polyol portion includes a catalyst that is present at greater than about 0.17 percent by weight solids in the entire top coat. As used herein, the phrase "weight solids" means the weight of the substance or composition in question minus the weight of any solvents present (such as methyl isobutyl ketone, methyl amyl ketone, or n-butyl acetate).

Still another aspect of the invention is a method of coating a golf ball by applying a urethane top coat as previously defined to the surface of the golf ball.

Another aspect of the invention is a golf ball having a cover that is coated with a urethane top coat as previously defined.

DETAILED DESCRIPTION OF THE INVENTION

The polyurethane top coat of the present invention is a two-part solvent borne polyurethane system. The first part comprises a hydroxyl functional polyol having an hydroxyl equivalent weight in the range of 50 to 1500, with the preferred equivalent weight being 200 to 500. Compounds containing the hydroxyl functional polyol contemplated herein include polyesters, polyethers, or acrylics. Alternately, the hydroxyl functional polyol is ethylenically saturated. Suitable saturated polyesters for use herein include poly (oxydiethylene adipates) that are condensation products of diethylene glycol and adipic acid, branched with trimethylolpropane or pentaerythritol, and polycaprolactone (hydroxycaproic acid) polyesters. Suitable saturated polyethers include polymers of propylene oxide or propylene oxide/ethylene oxide. Such materials are usually triols or diols with molecular weights between 1000 and 7000. Suitable saturated acrylics include derivatives of acrylic acid, such as methyl methacrylate, co-polymerized with hydroxyl functional monomers, such as 2-hydroxy-ethyl methacrylate. Polyols marketed by Miles Corporation, Pittsburgh, Pa., under the trademark DESMOPHEN are particularly contemplated for use herein. One such resin is Desmophen 651A-65. Several others are Desmophen 670A-80 and Desmophen 631A-75.

In addition to these polyhydroxyl compounds, other materials containing a reactive hydrogen atom that would react with the isocyanate or isocyanurate group to form the polyurethane can be utilized. Such materials include polyamines, polyamides, short oil alkyds, castor oil, epoxy resins with secondary hydroxyl groups, phenolic resins, and hydroxyl functional vinyl resins. Suitable examples of such materials include Ancamine 2071, a modified polyamine marketed by Pacific Anchor Chemical Corporation, Los Angeles, Calif., EPON V-40, a polyamide marketed by Shell Chemical Company, Houston, Tex., Aroplaz 1133-X-69, a short oil alkyd marketed by Spencer Kellogs Products Div., Reichhold Chemicals Inc., Minneapolis, Minn., EPON resin 828, an epoxy resin marketed by Shell Chemical Company, Pentalyn 802A, a phenolic modified polyester resin Marketed by Hercules Inc., Wilmington, Del., and VAGH, a hydroxyl functional vinyl resin marketed by Union Carbide, Danbury, Conn.

The hydroxyl functional polyol is carried in a solvent, with the solvent solution containing from about 15 to 35% by weight of the polyol solids. Suitable solvents for use herein include the known polyurethane solvents, for example, butyl acetate, methyl isobutyl ketone, methyl amyl ketone, propylene glycol monomethyl ether acetate, and mixtures thereof. Particularly suitable as a solvent or co-solvent is methyl amyl ketone because its high dipole constant permits a greater amount of polyol or other resin solids to be dispersed therein. The advantages of the use of methyl amyl ketone in top coat coating systems, as well as examples illustrating such use, are described in U.S. Pat. No. 5,409,233 by Thomas Kennedy, the disclosure of which is hereby incorporated by reference.

Other additives can be included in the first part of the polyurethane system. These additives include U.V. stabilizers and absorbers, leveling agents, optical brighteners, mar and slip agents, catalysts, antioxidants, reactive diluents, and defoaming agents.

U.V. stabilizers function to tie up free radicals in the top coating that are produced upon exposure to ultraviolet radiation, thus maintaining the integrity of the coating. A suitable U.V. stabilizer is Tinuvin 292, a hindered amine light stabilizer sold by Ciba-Geigy Corporation, Ardsley, N.Y. U.V. absorbers function to absorb ultraviolet radiation and re-emit it as heat. Examples of suitable U.V. absorbers for use in the present invention are Tinuvin 1130, a benzotriazole U.V. absorber sold by Ciba-Geigy Corporation, and Sanduvor 3206, an oxalamide derivative sold by Clariant Corporation, Charlotte, N.C.

Suitable leveling agents which reduce the surface tension of the coating for improved coating flow include Fluorad FC-430, a fluorochemical surfactant sold by 3M Industrial Chemical Products Division, St. Paul, Minn. and DOW 57, a silicone additive sold by Dow Coming Corporation, Midland, Mich.

Optical brighteners are added to the polyurethane system so that the coating coverage can be checked under U.V. light, as well as to brighten the balls. Suitable optical brighteners include Uvitex OB, believed to be 2,2'-(2,5-thiophenediyl) bis (5-ter-butylbenzoxazole), sold by Ciba-Geigy Corporation, Ardsley, N.Y., and Leucopure EGM, a coumarin optical brightener sold by Sandoz Chemicals Corporation, Charlotte, N.C.

Catalysts are added to increase or control the rate of reaction between the first and second parts of the polyurethane system. Catalysts contemplated for use herein include zinc octoate, zinc octanoate, potassium octoate, potassium acetate, and organotin compounds such as dibutyltin dilaurate, dibutyltin diacetate, dibutyltin di(2-ethylhexanoate), stannous octanoate, dibutyltin bis(isooctyl mercaptoacetate), dioctyltin bis(isooctyl mercaptoacetate), dimethyltin bis(isooctyl mercaptoacetate), bis(2-carbobutoxyethyltin) bis(isooctyl mercaptoacetate), dibutyltin sulfide dibutyltin bis(lauryl mercaptide), dibutyltin β-mercaptopropionate dibutyltin bis (mercaptoethyldecanoate) (also other esters), butylthiostannoic acid anhydride, butyltin tris(isoctylmercaptoacetate), dibutyltin maleate (dioctyltin derivative), dibutyltin bis (monoisooctylmaleate) (also other alkyl maleate esters), stannous acetate, stannous ethylene glycoxide, stannous formate, stannous gluconate, stannous oleate, stannous stearate, stannous tartrate, stannous oxalate, tetrabutyltin, $(CH_3)_2SnCl_2$, $(C_4H_9)_2SnCl_2$, $(C_4H_9)_2SnBr_2$, $(C_4H_9)_2SnI_2$, $(C_6H_5)_2SnCl_2$, $(CH_3OC(O)CH_2CH_2)_2SnCl_2$, $(CH_3)_2Sn(SC_4H_9)_2$, $(C_4H_9)_2Sn(SC_4H_9)_2$, $(C_4H_9)_2Sn(OCH_3)_2$, $CH_3SnCl_3$, $CH_3SnBr_3$, $C_4H_9SnCl_3$, $C_6H_5SnCl_3$, $[(C_4H_9)_2SnS]_3$, $[C_4H_9Sn]_2O$, $(C_4H_9)_3SnF$, $(C_4H_9)_3SnOCOC_6H_5$, $(C_4H_9)_3SnOCOCH_3$, $(C_6H_5)_3SnOH$, $(C_6H_5)_3SnF$, $(C_6H_5)_3SnOCOCH_3$, $(C_6H_{11})_3SnOH$, $(C_6H_{11})_3SnN_3C_2H_2$, $(Neoph_3Sn)_2O$, $(CH_3)_3SnCl$, $(CH_3)_3SnBr$, $(C_4H_9)_3SnCl$, $(C_6H_5)_3SnCl$, $(C_6H_{11})_3SnCl$, $(CH_3)_4Sn$, $(C_4H_9)_4Sn$, $(C_8H_{17})_4Sn$, $(C_6H_5)_4Sn$, $(C_6H_{11})_4Sn$, $(CH_2=CH)_4Sn$, $(CH_3)_2(C_4H_9)_2Sn$, $(C_2H_5)_3(C_4H_9)Sn$,

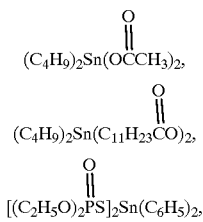

and

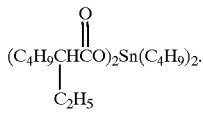

Any other suitable catalyst known to those skilled in the art is contemplated for use in the inventive polyurethane system, including any other organotin compounds described in 23 KIRK-OTHMER, ENCYCLOPEDIA OF CHEMICAL TECHNOLOGY 52–77 (3rd ed. 1983), which is incorporated herein by reference. Catalysts can be added to the system in any amount effective to obtain the desired impact on the rate of reaction. Alternately, catalysts can be added at greater than about 0.17 percent by weight of solids in the entire polyurethane system. Several commercial catalysts, available from Air Products and Chemicals, Inc., Allentown, Pa., are Dabco K-15 (based on potassium octoate), Dabco T-12 (dibutyltin dilaurate), Dabco T-120, and Polycat 46 (based on potassium acetate).

Reactive diluents are added to the polyurethane system in order to reduce viscosity and improve flow of the components. When the polyurethane coat is formed, the diluent reacts into the system leaving behind no residual material that must be removed. Reactive diluents contemplated for use herein include butyl glycidyl ether, $C_8$–$C_{10}$-aliphatic monoglycidal ether, $C_{12}$–$C_{14}$-aliphatic monoglycidal ether, cresyl glycidyl ether, neopentyl glycol diglycidyl ether, and oxazoladine-based reactive diluents. Any other suitable reactive diluent known to those skilled in the art is contemplated for use in the inventive polyurethane system. Several commercial oxazoladine-based reactive diluents, available from Angus Chemicals, Inc., Buffalo Grove, Ill., are ZOLDINE RD-20 and ZOLDINE RD-4.

In addition to the additives, co-reactants can be incorporated into the polyol portion of the coating system. Such co-reactants can be either compositions that further polymerize with heat, or compositions that form a film after the solvent is evaporated during the polyurethane polymerization process. Such materials do not react with the isocyanate or isocyanurate portion of the coating system, but instead act independently to improve the final coating properties. A suitable polymerizing material for use herein is Cymel 303, a melamine resin sold by American Cyanamid. An example of a suitable film-forming resin is A-101, an acrylic, non-hydroxyl containing resin sold by Rohm & Haas, Philadelphia, Pa.

The additives and co-reactants are added in amounts from about 0–20% by weight of the total coating system. Preferably they are added in amounts from about 1–5% by weight of the total coating system.

The second part of the polyurethane system comprises a blend of an aliphatic diisocyanate and an aliphatic/aromatic polyisocyanate copolymer carried in a solvent. While various aliphatic diisocyanates may be used in the blend, excellent color retention, adhesion, and abrasion resistance in the polyurethane top coating are achieved with a biuret or trimer of hexamethylene diisocyanate (HDI), as described in U.S. Pat. No. 5,549,220. The biurets and isocyanurate trimers of HDI utilized in the present invention should have a viscosity within the range of about 3 to 10,000 cps, with the preferred range being from about 50 to 5,000 cps. Low viscosity biuret and trimer crosslinking agents are preferred because they allow the total coating system to have a higher solids content and still have a viscosity that facilitates spray painting/air atomization of the coating system on the outer surface of the golf ball. Biurets and trimers of HDI contemplated for use herein are sold by Miles under the trademark DESMODUR. One such composition is DESMODUR N-3200, a low viscosity biuret of HDI. The isocyanate or isocyanurate equivalent weight of the biuret or trimer crosslinking agent used herein should be within the range of 100 to 1,200, alternately 150 to 300.

The second component of the isocyanate blend comprises an aliphatic/aromatic polyisocyanate copolymer. While various aliphatic/aromatic polyisocyanate copolymers may be suitable, desirable results are achieved with a copolymer composed of both HDI and toluene diisocyanate (TDI). One such copolymer is sold by Miles Corporation, Pittsburgh, Pa., under the trademark DESMODUR HL (the copolymer is dissolved in n-butyl acetate and is sold as a clear liquid). It has been found that the addition of such a copolymer to the second part of the polyurethane top coat improves the drying (or curing) time of the top coat while at the same time maintaining desirable qualities such as superior adhesion and abrasion resistance, and good color retention upon exposure to ultraviolet radiation. This result is unexpected because, among other things, the copolymer blend is partly aromatic, and prior urethane coatings made from aromatic diisocyanates tended to yellow very quickly upon exposure to ultraviolet light. To achieve the desired results, the aromatic/aliphatic polyisocyanate copolymer should be in the composition at up to 50 parts by weight per 50 parts by weight of the purely aliphatic diisocyanate. Alternately, the aromatic/aliphatic polyisocyanate copolymer should be in the composition at up to 30 parts by weight per 70 parts by weight of the aliphatic diisocyanate. As yet other alternatives, the aromatic/aliphatic polyisocyanate copolymer should be in the composition at up to 20 parts by weight per 80 parts by weight of the aliphatic diisocyanate, or at up to 10 parts by weight per 90 parts by weight of the aliphatic diisocyanate.

The isocyanate blend is carried in a solvent, with the solvent solution containing from a minimum of about 40% (or less, if a quite dilute solution is preferred for some reason), alternatively about 60%, alternatively about 70%, to a maximum of 100%, alternatively about 85%, by weight of the aliphatic diisocyanate and the aliphatic/aromatic polyisocyanate copolymer. Suitable solvents for the blend include methyl isobutyl ketone, methyl amyl ketone, butyl acetate and propylene glycol monomethyl either acetate. The use of methyl isobutyl ketone as the solvent or part-solvent is advantageous in that it tends to alleviate any potential moisture problems encountered with the acetate solvents.

The first part of the polyurethane coating system containing the polyol and other additives is mixed with the second part of the coating system containing the isocyanate blend at an index or ratio of N=C=O to OH in the range of 0.90 to 1.5, alternately with an index in the range of 0.95 to 1.2. An index of 1.05 may be advantageous since it takes into account any water that may be present in the polyol, and water vapor present in the air. The excess isocyanate insures that all of the polyol will be polymerized, with any excess isocyanate being converted to a polyurea. If any excess polyol is present, it will not polymerize and tends to act as a plasticizer, thus resulting in a coating of decreased hardness. When the two parts of the coating system are combined, the total system has the following general formulation:

| | |
|---|---|
| Polyol and isocyanate blend | 35–100% |
| Solvent | 0–65% |
| Additives and/or co-reactants | 0–20% |

The coating system is applied to the outer surface of the golf ball using any conventional method. The outer surface may be either the cover of the golf ball or, more typically, a primer coat that has been applied to the cover of the golf ball. The cover of the golf ball is usually made of an ionomer resin such as SURLYN (a trademark of E.I. DuPont De Nemours & Co., Wilmington, Del.) or IOTEK (a trademark of Exxon Chemical Co., Polymers Group, Baytown, Tex.). The cover may, however, be made of balata (a natural resin) or a thermoplastic polyurethane. For golf balls having a cover made of an ionomer having a relatively high zinc content, a cover made of thermoplastic polyurethane, or a cover made of mixtures of ionomers and polyurethanes, a primer coat may not be necessary. Thus, the top coat can be applied directly to the cover of the ball with good adhesion. Also, the urethane coatings herein having a relatively high index exhibit very good adhesion to the golf ball cover without the need for a primer coat.

Whether the top coat is applied directly to the cover or to a primer coat, it is preferred that the coating system be applied by spraying the coating onto the ball. One method of spraying the coating is as follows: Using plural spray equipment, separate streams of the polyol and the isocyanate blend are mixed just prior to entering an air atomizing spray gun. Dry air is used to push the coating into the spray gun where it is forced out of a small diameter (0.1 inches) fluid nozzle. The material is then atomized at the tip of the gun by the air cap, again using dry air. This forms a fan of the droplets that impinge upon the surface of the golf ball. The golf balls are then placed in a 160° F. oven until the solvent evaporates and the polyol and the isocyanates polymerize to form the polyurethane top coat.

The inventive top coating demonstrates an increased rate of curing compared to other top coatings having similar abrasion resistance and color retention qualities. It is believed that the increased rate of curing can be attributed to the aromatics present in the isocyanate copolymer, although the inventor in no way intends to be bound by this theory. Despite the presence of some aromatics, the inventive top coating tends to be less subject to the yellowing that plagued early urethane coatings made from aromatic diisocyanates. Several distinct benefits can be realized by increasing the cure rate, and thereby reducing the heat applied to the golf balls or the amount of time the golf balls spend in the ovens. Because less energy is applied during the manufacturing process, the cost of manufacturing is reduced. In addition, there is less chance that the heating process will damage the underlying surface of the golf balls.

The invention is further illustrated, but is not intended to be limited by, the following examples.

EXAMPLE 1

A composition in accordance with the present invention is made using the ingredients in Table 1. Using plural spray equipment, portion "A" is mixed with portion "B" and the mixture is immediately sprayed onto the surface of a dozen golf balls. The golf balls are baked in an oven set at 160° F. for eight minutes and then exposed to room temperature air for approximately twenty minutes.

TABLE I

| MATERIAL | WEIGHT | WEIGHT SOLIDS |
|---|---|---|
| PART A | | |
| Polyester resin in solvent (Desmophen 670A-80) | 83.62 | 66.90 |
| Polyester resin in solvent (Desmophen 631A-75) | 31.86 | 23.89 |
| Methyl isobutyl ketone | 33.98 | 0.00 |
| Methyl amyl ketone | 41.54 | 0.00 |
| Leveling additive (Fluorad FC-430) | 0.34 | 0.34 |
| U.V. stabililzer (Tinuvin 292) | 0.80 | 0.80 |
| U.V. absorber (Sanduvor 3206) | 0.80 | 0.80 |
| Optical brightener (Uvitex OB) | 0.11 | 0.11 |
| Reactive diluent (Zoldine RD-20) | 4.78 | 4.78 |
| Catalyst (Dabco T-12) | 0.32 | 0.32 |
| PART B | | |
| HDI biuret (Desmodur N-3200) | 57.66 | 57.66 |
| Polyisocyanate copolymer in solvent (Desmodur HL) | 10.68 | 6.41 |
| Methyl isobutyl ketone | 15.08 | 0.00 |
| Methyl amyl ketone | 18.44 | 0.00 |
| TOTAL (parts A and B) | 300.01 | 162.01 |
| Weight parts polyisocyanate copolymer per weight parts diisocyanate (HDI biuret) | 10:90 | |

The quality of the top coat on the finished golf balls is assessed by aging the golf balls in a xenon arc weatherometer and by subjecting the balls to a "wet barrel" test. The wet barrel test is conducted by soaking a dozen finished and cured golf balls that have been out of the oven for at least 48 hours in tap water for three hours. The balls are then shot at 125 feet/sec. against a steel wall that is at a 45 degree angle to the vector of the golf ball. The steel wall also has vertical corrugations on it to simulate the face of a golf club. The ball is allowed bounce around in a barrel (hexagonal shaped) and, after reaching the bottom, is returned to the beginning of the cycle. The test is repeated 100 times. At the end of the test, the golf balls are dyed using a Pylam dye. This dye stains the coating brown but leaves the ionomer cover white, thus showing areas where the coating has worn off.

The golf balls made in accordance with Example 1 demonstrate excellent adhesion and abrasion resistance and also good color retention (non-yellowing) properties and yet exhibit an increased rate of curing compared to other top coatings with similar properties. The rate of curing is gauged by assessing the tackiness of the golf balls approximately ten minutes after they leave the oven. The balls made in accordance with Example 1 exhibit less tackiness (indicative of faster curing) than similar balls covered with existing top coats having similar abrasion and color retention qualities.

EXAMPLE 2

A composition in accordance with the present invention is made using the ingredients in Table 2. Using plural spray equipment, portion "A" is mixed with portion "B" and the mixture is immediately sprayed onto the surface of a dozen golf balls. The golf balls are baked in an oven set at 160° F. for eight minutes and then exposed to room temperature air for approximately twenty minutes.

TABLE 2

| MATERIAL | WEIGHT | WEIGHT SOLIDS |
|---|---|---|
| PART A | | |
| Polyester resin in solvent (Desmophen 670A-80) | 83.34 | 65.87 |
| Polyester resin in solvent (Desmophen 631A-75) | 31.37 | 23.53 |
| Methyl isobutyl ketone | 34.13 | 0.00 |
| Methyl amyl ketone | 41.72 | 0.00 |
| Leveling additive (Fluorad FC-430) | 0.34 | 0.34 |
| U.V. stabililzer (Tinuvin 292) | 0.80 | 0.80 |
| U.V. absorber (Sanduvor 3206) | 0.80 | 0.80 |
| Optical brightener (Uvitex OB) | 0.11 | 0.11 |
| Reactive diluent (Zoldine RD-20) | 4.71 | 4.71 |
| Catalyst (Dabco T-12) | 0.32 | 0.32 |
| PART B | | |
| HDI biuret (Desmodur N-3200) | 46.51 | 46.51 |
| Polyisocyanate copolymer in solvent (Desmodur HL) | 33.22 | 19.93 |
| Methyl isobutyl ketone | 11.05 | 0.00 |
| Methyl amyl ketone | 13.50 | 0.00 |
| TOTAL (parts A and B) | 300.92 | 162.92 |
| Weight parts polyisocyanate copolymer per weight parts diisocyanate (HDI biuret) | 30:70 | |

The quality of the top coat on the finished golf balls is assessed by aging the golf balls in a xenon arc weatherometer and by subjecting the balls to a "wet barrel" test. The golf balls made in accordance with Example 2 demonstrate excellent adhesion and abrasion resistance and also good color retention (non-yellowing) properties and yet exhibit an increased rate of curing compared to other top coatings with similar properties. Specifically, the balls made in accordance with Example 2 are tack-free when tackiness is assessed approximately ten minutes after the balls leave the oven.

What is claimed is:

1. A two-part polyurethane top coat, comprising:
   a first part comprising a polyol; and
   a second part comprising
   (a) an aliphatic diisocyanate; and
   (b) an aliphatic/aromatic polyisocyanate copolymer;
   wherein said aliphatic/aromatic polyisocyanate copolymer is present in said second part in a sufficient amount to accelerate curing of said top coat and wherein said amount is less than 50 parts by weight per 50 parts by weight of the aliphatic diisocyanate.

2. A polyurethane top coat, comprising the reaction product of:
   a first part comprising a polyol; and
   a second part comprising
   (a) an aliphatic diisocyanate; and
   (b) an aliphatic/aromatic polyisocyanate copolymer;
   wherein said aliphatic/aromatic polyisocyanate copolymer is present in said second part in a sufficient amount to accelerate curing of said top coat and wherein said amount is less than 50 parts by weight per 50 parts by weight of the aliphatic diisocyanate.

3. The polyurethane top coat as in claim 2, wherein said aliphatic diisocyanate is selected from the group consisting of a biuret of hexamethylene diisocyanate, an isocyanurate trimer of hexamethylene diisocyanate, and mixtures thereof.

4. The polyurethane top coat as in claim 2, wherein said aliphatic/aromatic polyisocyanate copolymer is comprised of toluene diisocyanate and hexamethylene diisocyanate.

5. The polyurethane top coat as in claim 2, wherein said first part further comprises a catalyst, wherein said catalyst is in said top coat at greater than about 0.17 percent by weight solids in the top coat.

6. The polyurethane top coat as in claim 2, wherein said aliphatic/aromatic polyisocyanate copolymer is present in said second part at up to 30 parts by weight per 70 parts by weight of the aliphatic diisocyanate.

7. The polyurethane top coat as in claim 2, wherein said aliphatic/aromatic polyisocyanate copolymer is present in said second part at up to 20 parts by weight per 80 parts by weight of the aliphatic diisocyanate.

8. The polyurethane top coat as in claim 2, wherein said aliphatic/aromatic polyisocyanate copolymer is present in said second part at up to 10 parts by weight per 90 parts by weight of the aliphatic diisocyanate.

9. A polyurethane top coat, comprising:
   a polyol;
   an aliphatic diisocyanate; and
   an aliphatic/aromatic polyisocyanate copolymer;
   wherein said aliphatic/aromatic polyisocyanate copolymer is present in said top coat in a sufficient amount to accelerate curing of said top coat and wherein said amount is less than 50 parts by weight per 50 parts by weight of the aliphatic diisocyanate.

* * * * *